US008025528B2

(12) United States Patent
Smith

(10) Patent No.: US 8,025,528 B2
(45) Date of Patent: Sep. 27, 2011

(54) QUICK MOUNTING DEVICE WITH MODULES

(76) Inventor: Benjamin J. Smith, Las Vegas, NV (US)

( * ) Notice: Subject to any disclaimer, the term of this patent is extended or adjusted under 35 U.S.C. 154(b) by 0 days.

(21) Appl. No.: 12/876,296

(22) Filed: Sep. 7, 2010

(65) Prior Publication Data

US 2011/0177708 A1     Jul. 21, 2011

Related U.S. Application Data

(60) Provisional application No. 61/296,962, filed on Jan. 21, 2010.

(51) Int. Cl.
*H01R 13/60* (2006.01)
(52) U.S. Cl. .......................... 439/537; 439/140; 439/313
(58) Field of Classification Search ................. 439/537, 439/140, 313, 337, 673
See application file for complete search history.

(56) References Cited

U.S. PATENT DOCUMENTS

| | | | |
|---|---|---|---|
| 3,693,921 A | 9/1972 | Beaucher | |
| 3,798,584 A | 3/1974 | Person | |
| 3,996,415 A | 12/1976 | Provorse | |
| 4,295,180 A | 10/1981 | Herron et al. | |
| 4,296,280 A | 10/1981 | Richie | |
| 4,403,278 A | 9/1983 | Flood | |
| 4,449,168 A | 5/1984 | Ewing | |
| 4,645,286 A | 2/1987 | Isban et al. | |
| 4,645,289 A | 2/1987 | Isban | |
| 4,843,782 A | 7/1989 | Gustaveson et al. | |
| 4,887,073 A | 12/1989 | Nakao et al. | |
| 5,064,161 A | 11/1991 | Anderson | |
| 5,542,859 A | 8/1996 | Ison et al. | |
| 5,562,341 A | 10/1996 | Strauss | |
| 5,619,217 A | 4/1997 | Mailandt et al. | |
| 5,622,395 A | 4/1997 | Shine et al. | |
| 5,924,665 A | 7/1999 | Sweere et al. | |
| 5,931,432 A | 8/1999 | Herold et al. | |
| 6,042,068 A | 3/2000 | Tcherny | |
| 6,070,383 A | 6/2000 | Jeanseau | |
| 6,093,044 A | 7/2000 | Arbuckle | |
| 6,131,863 A | 10/2000 | Fiacco | |
| 6,164,475 A | 12/2000 | Jorgensen | |
| 6,210,208 B1 | 4/2001 | Barnes et al. | |
| 6,266,250 B1 | 7/2001 | Foye | |
| 6,322,232 B1 | 11/2001 | Oliver | |
| 6,376,770 B1 | 4/2002 | Hyde | |
| 6,379,012 B1 | 4/2002 | Enochs et al. | |
| 6,482,018 B1 | 11/2002 | Stekelenburg | |
| 6,503,099 B2 * | 1/2003 | Kerr, Jr. | 439/537 |
| 6,634,901 B2 | 10/2003 | Kerr, Jr. | |
| 6,648,488 B1 | 11/2003 | Pearce | |
| 6,669,029 B1 | 12/2003 | Beane | |
| 6,676,442 B2 | 1/2004 | Kerr, Jr. | |
| 6,679,647 B2 | 1/2004 | Hixon | |
| 6,752,366 B2 | 6/2004 | Chuang | |
| 6,780,049 B1 | 8/2004 | D'Angelo et al. | |
| 6,799,982 B2 | 10/2004 | Kerr, Jr. | |
| 6,857,903 B2 | 2/2005 | Hyde | |
| 6,863,499 B2 | 3/2005 | Pearce | |
| 6,872,054 B2 | 3/2005 | Pearce | |
| 6,932,578 B2 | 8/2005 | Pearce | |
| 6,945,815 B1 | 9/2005 | Mullally | |
| 6,956,170 B1 | 10/2005 | Gretz et al. | |

(Continued)

*Primary Examiner* — Hien Vu
(74) *Attorney, Agent, or Firm* — Triangle Patents

(57) ABSTRACT

A quick mounting device for appliances that is quickly and easily engaged and disengaged mechanically without the use of tools and has at least one modular connection.

7 Claims, 14 Drawing Sheets

U.S. PATENT DOCUMENTS

| | | |
|---|---|---|
| 6,997,740 B2 | 2/2006 | Kerr |
| 7,094,113 B1 | 8/2006 | Hasenour et al. |
| 7,095,608 B2 | 8/2006 | Simmons et al. |
| 7,104,828 B1 * | 9/2006 | Lin .................. 439/337 |
| 7,156,359 B2 | 1/2007 | Dittmer et al. |
| 7,160,148 B2 | 1/2007 | Kerr |
| 7,175,152 B2 | 2/2007 | Dittmer |
| 7,201,354 B1 | 4/2007 | Lee |
| 7,207,543 B2 | 4/2007 | Ortwein |
| 7,242,576 B2 | 7/2007 | Coster et al. |
| 7,249,744 B2 | 7/2007 | Bacon et al. |
| 7,279,635 B2 | 10/2007 | Hyde |
| 7,297,022 B2 * | 11/2007 | Pearce .................. 439/537 |
| 7,315,417 B2 | 1/2008 | Chen et al. |
| 7,540,460 B2 | 6/2009 | Orth et al. |
| 7,540,790 B2 | 6/2009 | Weber et al. |
| 7,614,922 B1 | 11/2009 | Buse |
| 7,663,868 B1 | 2/2010 | Lam |
| 7,726,617 B2 | 6/2010 | Zambelli et al. |
| 2002/0111063 A1 | 8/2002 | Kerr |
| 2003/0026445 A1 | 2/2003 | Anderson |
| 2003/0060067 A1 | 3/2003 | Kerr, Jr. |
| 2003/0136605 A1 | 7/2003 | Chuang |
| 2003/0138291 A1 | 7/2003 | Hixon |
| 2003/0148649 A1 | 8/2003 | Kerr |
| 2004/0016561 A1 | 1/2004 | Barnes |
| 2004/0211872 A1 | 10/2004 | Dittmer et al. |
| 2005/0067180 A1 | 3/2005 | Dinh |
| 2005/0077446 A1 | 4/2005 | Bacon et al. |
| 2005/0085131 A1 | 4/2005 | Sutherland |
| 2005/0126813 A1 | 6/2005 | Hyde |
| 2005/0127260 A1 | 6/2005 | Dittmer |
| 2005/0279898 A1 | 12/2005 | Sweere et al. |
| 2010/0108837 A1 | 5/2010 | Felton |

* cited by examiner

Figure 12A — ARM
Figure 12B — PIVOT(S)
Figure 12C — WIRELESS (HOME)
Figure 12D — REMOTES
Figure 12E — WIRELESS (COMMERCIAL)

QUICK MOUNTING DEVICE WITH MODULES

CROSS-REFERENCE TO RELATED APPLICATIONS

This non-provisional utility patent application claims the benefit of prior filed U.S. provisional application Ser. No. 61/296,962 filed Jan. 21, 2010, which is incorporated herein by reference in its entirety.

BACKGROUND OF THE INVENTION

1. Field of the Invention

The present invention relates to mounting devices in general and particularly to appliance mounting devices allowing quick connection and mounting of appliances having modules 2. Description of the Prior Art There are numerous mechanical, electronic and electromechanical devices that require mounting on a surface such as a ceiling, wall or other surface. Typically the devices require a strong mechanical attachment to the ceiling, wall or other surface while at the same time requiring an electrical connection to power typically supplied by wiring in the ceiling, wall or other surface. Such devices include but are not limited to: ceiling fans, chandeliers and other lighting fixtures, hanging retractable power shop tools/devices, televisions (tubes, flat screens, plasma, etc.), projectors, speakers, cameras, fire/smoke/heat/gas detectors, garage door openers, microwave ovens and numerous other hanging fixtures.

U.S. Pat. No. 6,093,044 issued Jul. 25, 2000 and assigned to Pelco for a quick connect/disconnect mechanism describes a latch and catch quick connect/disconnect mechanism for mechanically mounting an electric or electronic device within a receptacle box or housing.

U.S. Pat. No. 6,042,068 issued Mar. 28, 2000 and assigned to Peerless Industries Inc for a low profile LCD projector mount describes a low profile projector mount having an upper element attached to the ceiling with slide guides projecting from its bottom surface and a lower element attached to the projector with flanges in slideable engagement with the guides. The upper element further has a spring-based latching mechanism.

U.S. Pat. No. 6,857,903 issued Feb. 22, 2005; U.S. Pat. No. 6,376,770 issued Apr. 23, 2002; US Pub. No. 2005/0126813 published Jun. 16, 2005 & US Pub. No. 2003/0124905 published Jul. 3, 2003 assigned to Eclectic Limited for a quick connecting universal electrical box and wiring system describes a quick connecting universal electrical box mounting system for the installation of electrical sockets, switches or any electronic component that is typically installed into a wall for users to access.

U.S. Pat. No. 4,403,278 issued Sep. 6, 1983 and assigned to Harvstone Manufacturing Corporation for a mounting system for suspended lighting fixtures describes a quick mounting system for suspended light fixtures, including a box which is open at one side and a plate dimensioned to cover the opening, a disengagable pivot positioned at one end of the box and plate, and a hooking means at the opposite end of the box and plate.

U.S. Pat. No. 7,201,354 issued Apr. 10, 2007 and assigned to KTV, USA Inc. for a video monitor mounting system describes a video monitor mounting system for use in conjunction with seat back, head restraint or roof mount applications. It includes a mounting tray fixed in a hollowed out socket formed in a seat back, the rear face of a head restraint or within a roof mount overhead console.

U.S. Pat. No. 3,693,921 issued September 1972 and assigned to the United States of America as represented by the Navy for a quick release mounting apparatus describes an apparatus for stable mounting of a device, such as a TV camera, to an underwater support, and which can be easily and quickly locked or unlocked from the support by manipulation of a lever.

U.S. Pat. No. 6,634,901 issued Oct. 21, 2003; U.S. Pat. No. 6,503,099 issued Jan. 7, 2003; & U.S. Pat. No. 6,799,982 issued Oct. 5, 2004 assigned to Angelo Fan Brace Licensing LLC for a quick connect device for electrical fixture describes a quick-connect device for hanging fans, lighting fixtures, and the like. A horizontal sliding connector is provided between the ceiling box and the electrical fixture to take the weight of the fixture as it is inserted.

U.S. Pat. No. 6,676,442 issued Jan. 13, 2004 and assigned to Angelo Fan Brace Licensing LLC for a quick connect device with easy installation features including plug and spring describes a quick-connect device for hanging fans, lighting fixtures, and the like.

U.S. Pat. No. 7,160,148 issued Jan. 9, 2007; U.S. Pat. No. 6,997,740 issued Feb. 14, 2006; US Pub No. 2002/0111063 published Aug. 15, 2002 & US Pub No. 2005/0272306 published Dec. 8, 2005 and assigned to Angelo Fan Brace Licensing LLC for a ceiling fixture with easy installation features describes a quick connect device for electrically and physically mounting the fan to a ceiling.

U.S. Pat. No. 3,798,584 issued March 1974 for a quick connect ceiling electrical fixture mounting describes a quick connect mounting for connecting an electrical fixture to a conventional outlet box positioned within a ceiling. An electrical fixture may be readily plugged into the ceiling and removed there from in the same manner as a conventional electrical plug is inserted into and withdrawn from a wall outlet.

U.S. Pat. No. 7,175,152 issued Feb. 13, 2007 and assigned to CSAV Inc. for a display mounting device describes a flat panel display mounting apparatus that enables quick and easy mounting and dismounting of the flat panel display.

U.S. Pat. No. 4,645,286 issued Feb. 24, 1987 and assigned to Elliot Isban for a quick connect power tap system describes a coupling system which allows for quickly changing electrical fixtures without rewiring.

U.S. Pat. No. 4,645,289 issued Feb. 24, 1987 to inventor Elliot Isban for a quick connect power tap system describes an improvement to U.S. Pat. No. 4,645,286 (described above).

US Pub. No. 20090280673 published Nov. 12, 2009 for a quick connect assembly; US Pub. No. 20070167072 published Jul. 19, 2007 for a quick connect device for electrical fixtures and US Pub. No. 20050148241 published Jul. 7, 2005 for a quick connect device for electrical fixtures describe a device for quick connecting and supporting fixtures, such as electrical fixtures.

SUMMARY OF THE INVENTION

The present invention relates to a system for quickly mounting appliances requiring modules to support structures.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 12A through E are perspective views of Modular attachments.

DETAILED DESCRIPTION

Figure 1:
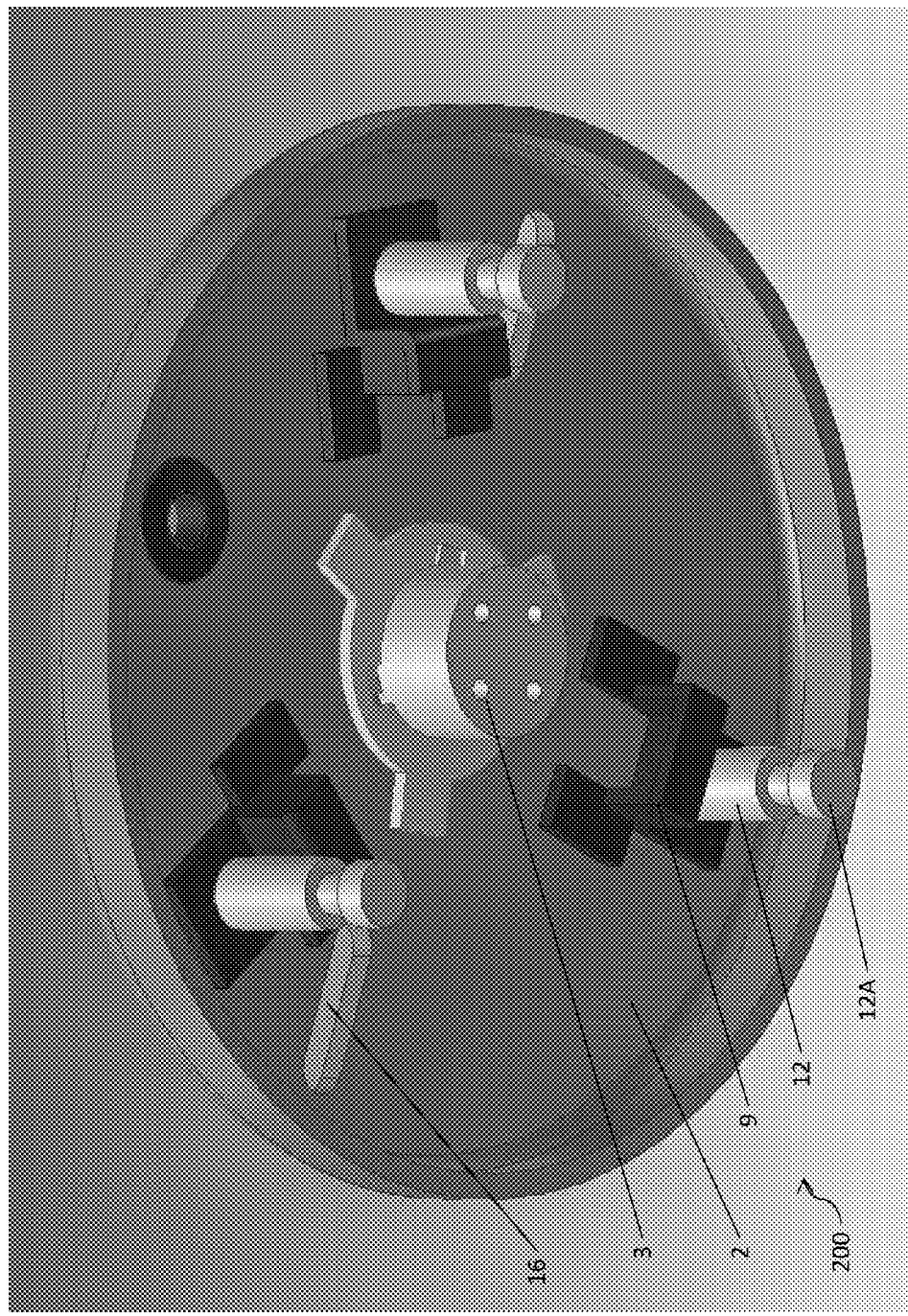
FIG. 1 is a bottom perspective view of one embodiment of the top plate of the invention.

The problems associated with the current methods of attaching such devices are numerous and include issues of safety, time and convenience. Current methods and devices for attachment require the simultaneous or near simultaneous connection of electrical connections and mechanical support attachments all while typically balancing on a ladder and using dangerous powered or unpowered tools. Current methods and devices are time-consuming; requiring different mechanical and electrical connections with each device—the majority of which are not user friendly. Many consumers must resort to the expense of a professional installer or handyman to make the required electrical and mechanical connections.

Disclosed herein is a quick mounting system that mounts electric, electronic, mechanical, electro-mechanical, gas and hydraulic devices to a ceiling, wall or other surfaces that addresses the above needs and deficiencies of current methods and devices. This mounting system can be used virtually anywhere a device or an object needs to be installed off the ground without the use of tools. The manually operated locking mechanism enables one to quickly and permanently lock the device/object in place by human hand as well as unlock it without the use of any tools. The quick mounting system may be used to attach/mount electrical, electronic, mechanical, electromechanical, gas and hydraulic devices with or without power as well as other objects that need to be mounted on walls, ceilings or other surfaces.

Referring now to the drawings in general, the illustrations are for the purpose of describing a preferred embodiment of the invention and are not intended to limit the invention thereto. The dimensions, specifications, materials and other call outs on the engineering drawings are representative only and not critical to the quick mount system. Other dimensions, specifications, materials and call outs are within the scope of the invention disclosed herein.

Figure 2:
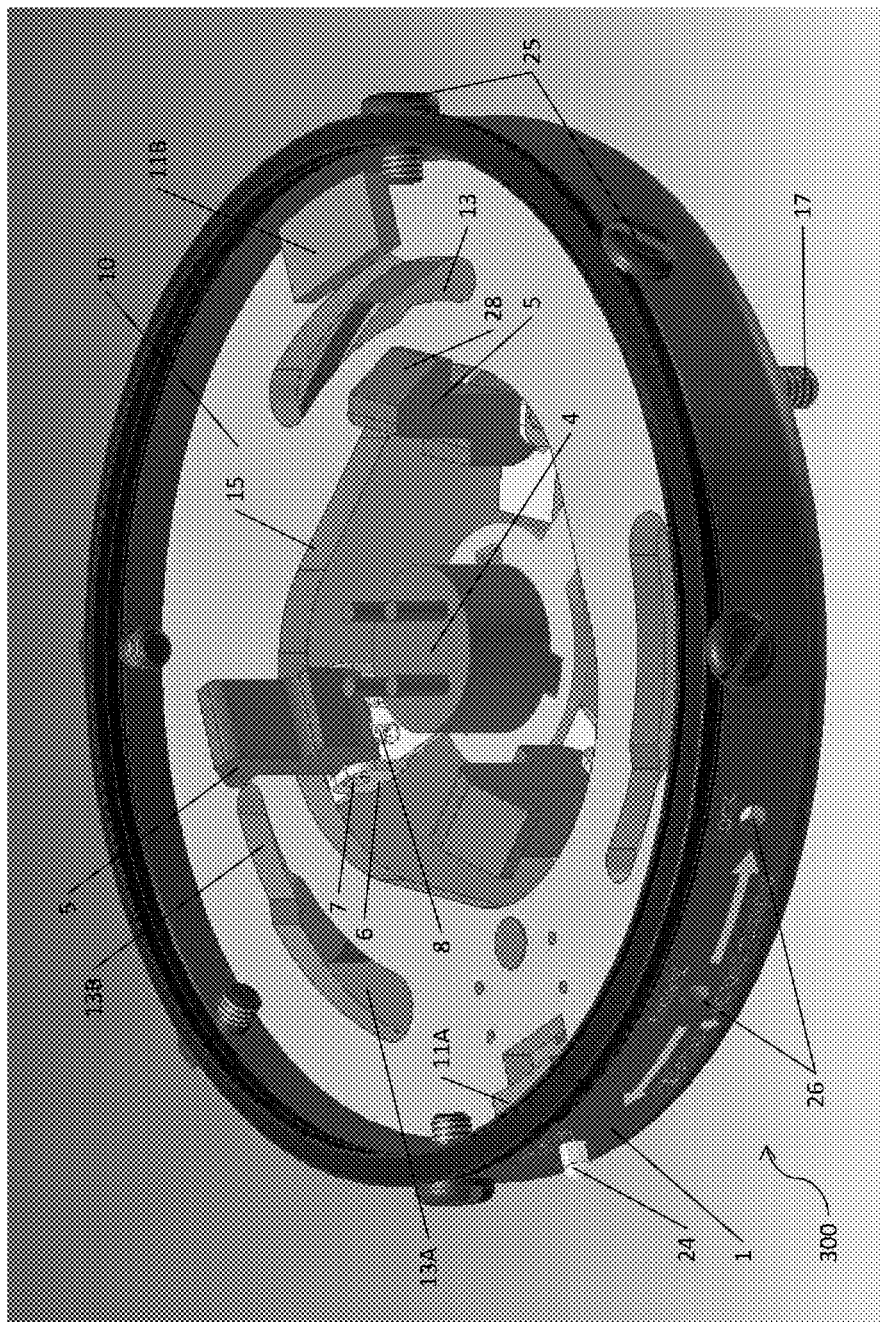
FIG. 2 is a top view of one embodiment of the bottom plate of the invention.
Figure 3:
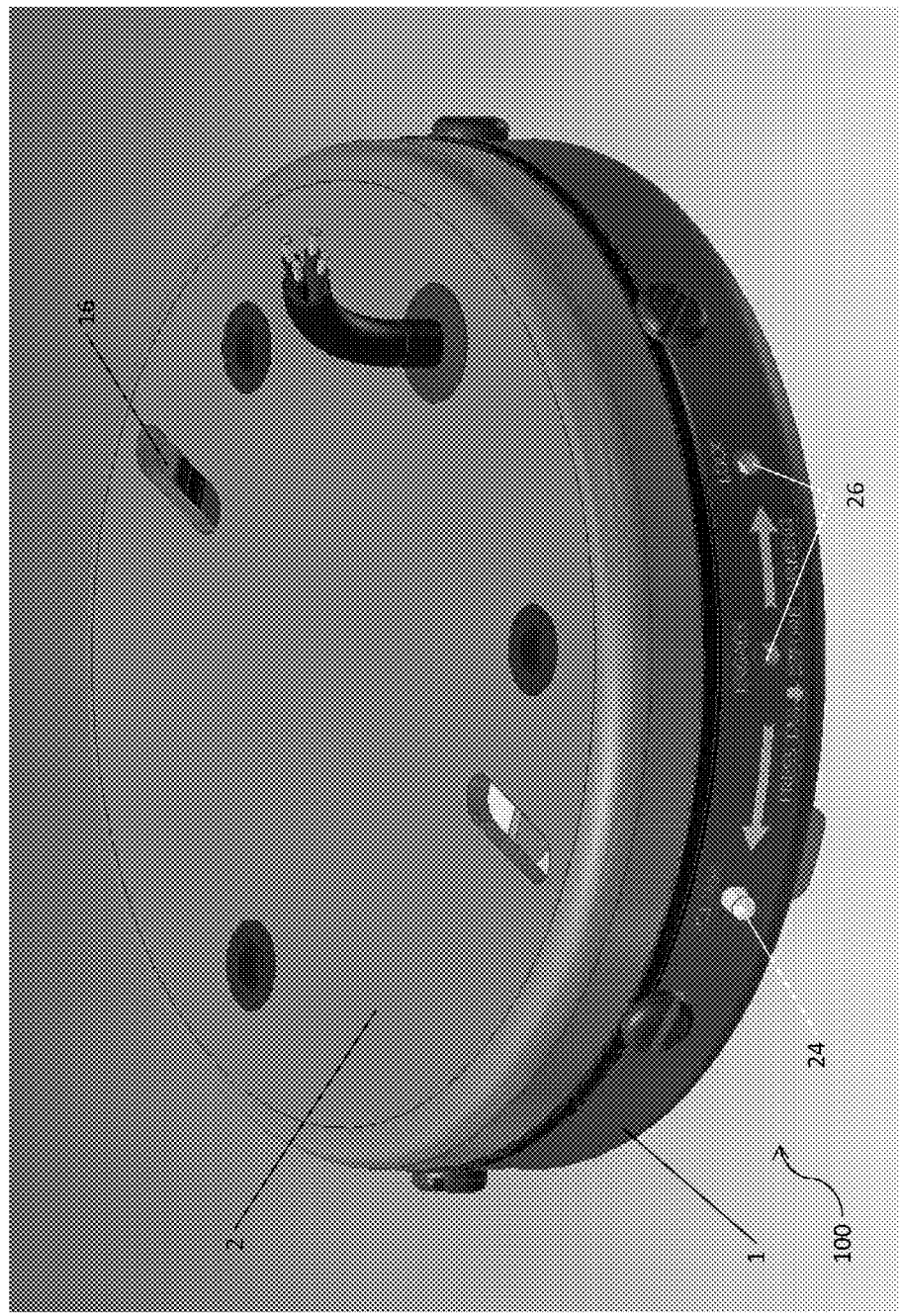
FIG. 3 is a top perspective view of an embodiment of the invention.
Figure 4:
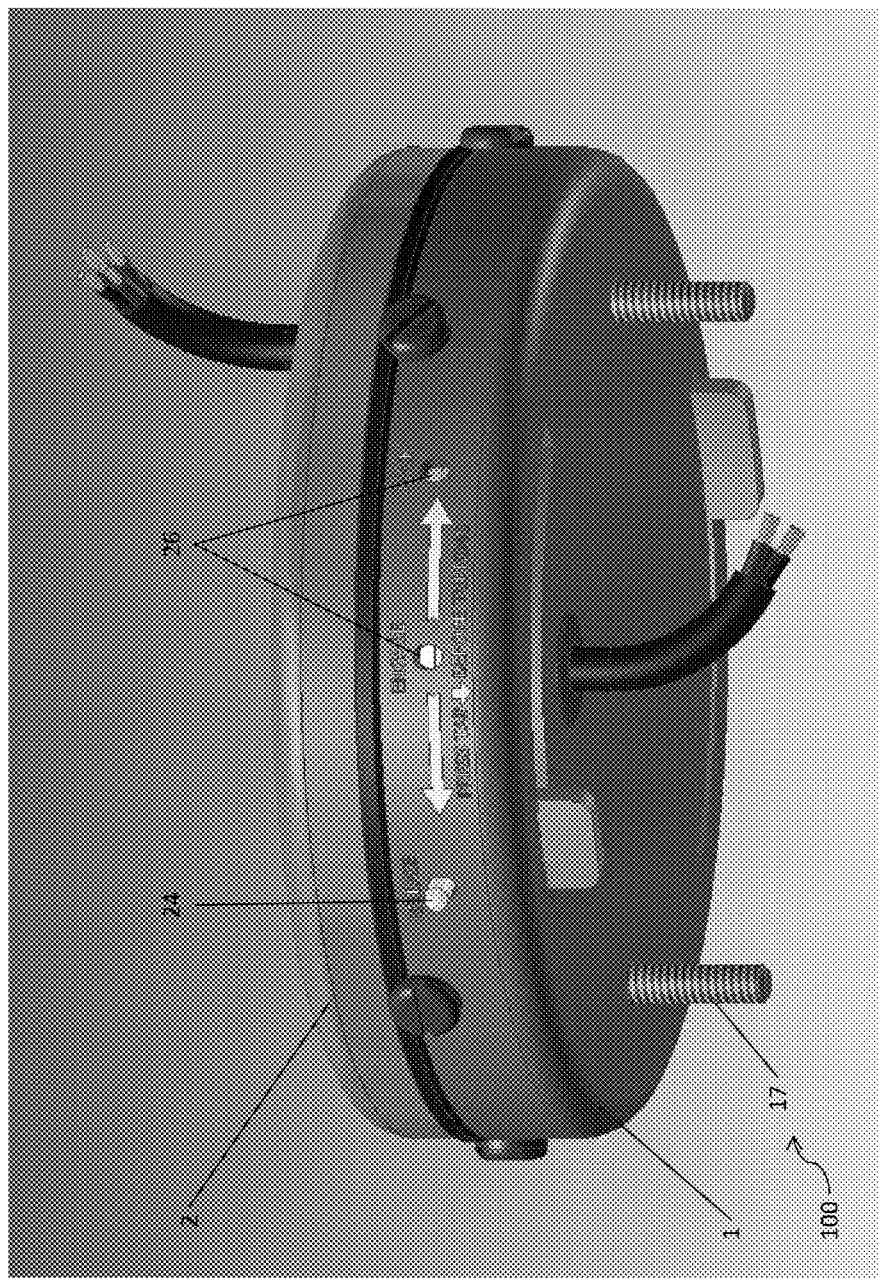
FIG. 4 is a bottom perspective view of an embodiment of the invention.

With reference to FIGS. 1 and 2, in one embodiment described herein, the quick mount system, generally described as 100, includes a first assembly and a second assembly, the two assemblies including at least one modular connector. The at least one modular connector includes, but is not limited to, analog and digital audiovisual connectors, other analog and digital communication connectors, electrical power connectors, gas connectors and liquid connectors.

With reference to FIGS. 1 and 2, in one embodiment described herein, the quick mount system, generally described as 100, includes a top assembly, generally described as 200, and a bottom assembly, generally described as 300. The main weight-bearing components of the device may be manufactured from mild steel. However, the device may be manufactured of any material that has the requisite strength and impact properties that may vary according to the type of apparatus the mounting device is designed to mount. With continuing reference to FIG. 1, included in the top assembly 200 is a first modular connector 3. The bottom assembly 300 includes a second modular connector 4 designed to mate with the first modular connector. In some embodiments, the connectors could be reversed, that is to say, the first connector may be housed in the bottom assembly and the second connector housed in the top assembly. In either case, the first and second connectors are preferably located substantially through the center of the bottom and top assemblies but in any event in such manner so that when the assemblies are brought together as intended by the invention the first and second modular connectors mate so as to form a modular connection. The modular connectors are preferably low profile, rear-mounting connectors but may be of other designs as well.

FIGS. 1, 3, 6A and 6B show the top assembly in detail including the top plate 2 and the three support pins 12 attached to the top plate 2. The top plate 2 would be attached to the wall, ceiling or other surface via the mounting slots 16. The connector 3 (shown in FIGS. 1 and 6B) in the top assembly 200 is connected to the power or other electrical supply in the wall, ceiling or other surface.

FIGS. 2, 4, 6C and 6D show the bottom assembly 300 and its components. The bottom assembly 300 includes a bottom plate 1 which is attached to the device to be mounted (e.g., ceiling fan, flat screen TV, etc.) via the special bolts 17 and the modular connector 4 in the bottom assembly 300 is connected to the channel or circuit required by the device to be mounted. Once the top assembly 200 is attached to the ceiling, wall or other surface and the bottom assembly 300 is attached to the device to be mounted on the ceiling, wall or other surface, the top assembly 200 and the bottom assembly 300 are merely brought together and a mechanical and modular connection is securely made as described below.

With reference to FIGS. 2 and 6A-D, three hooks 5 are attached via hook mounts 6, rivets 7 and hook springs 8 to the interior of the bottom plate 1. The hooks 5 are allowed to pivot around the rivets 7 and the hook springs 8 push the hooks toward the periphery of the assembly. The hook mounts 6 are permanently fastened to the bottom plate via screws or rivets. With additional reference to FIG. 1, the hooks 5 include a beveled edge 28 and the hooks are located on the bottom plate 1 so that when the bottom assembly 300 is brought up to and connected with the top assembly 200, the beveled edge 28 causes the hooks to retract toward the center of the assembly and slide around the hook slots 9 attached to the top assembly

200. Once past the hook slots, the hooks 5 extend toward the periphery and latch into hook slots 9. The hooks 5 are spring loaded in such manner that when the cam plate 10 is properly oriented, via the cam positioning tabs 11A and 11B, in the neutral or middle position as described below, the hooks pass freely past the hook slots in the top assembly 200 and catch securely in the hook slots.

Figure 7:
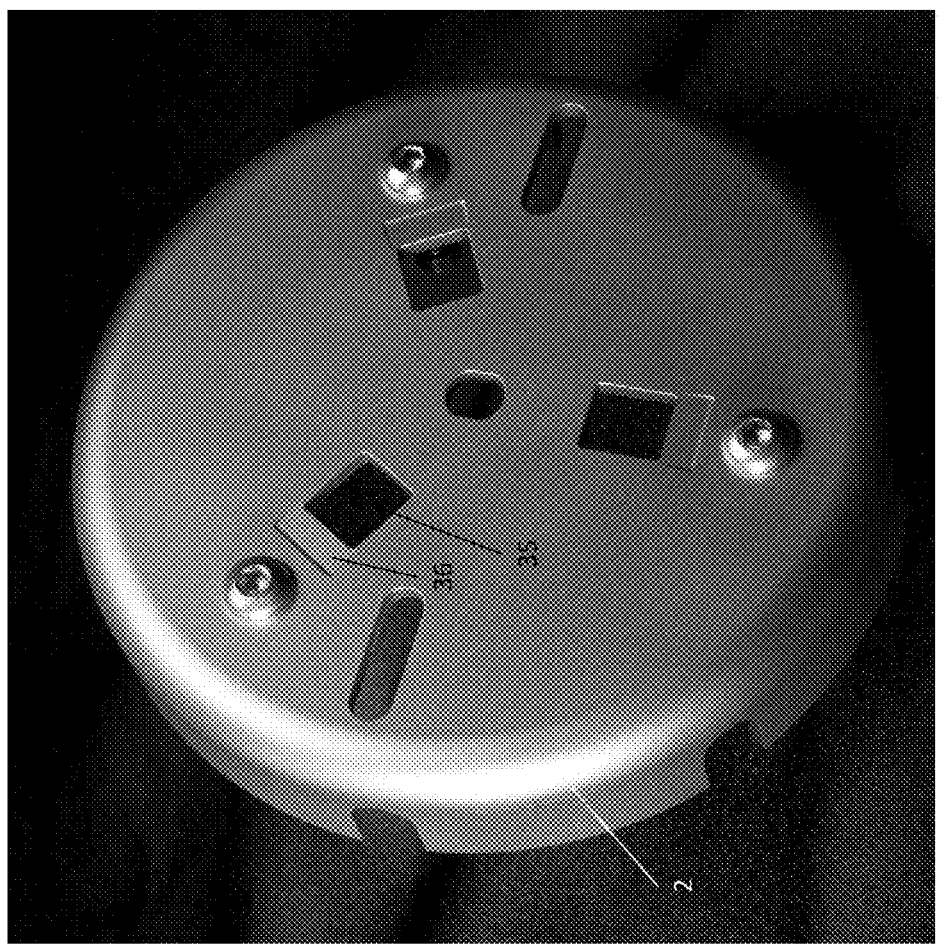
FIG. 7 is a top perspective view of one embodiment of the present invention showing the hook holes in the top plate.

Alternatively, as shown in FIG. 7, the hooks may pass through hook holes 35 in the top plate 2 and catch securely on scalloped areas 36 on the exterior surface of the top plate 2 adjacent the hook holes.

At that point, there is a mechanical connection between the top assembly 200, which is connected to the wall, and the bottom assembly 300, which is connected to the device desired to be mounted on the wall as well as a modular connection between the device and the power supply in the wall. Thus, the device is mechanically connected to the wall, ceiling or other surface and connected with the desired circuit or channel.

Figure 6:
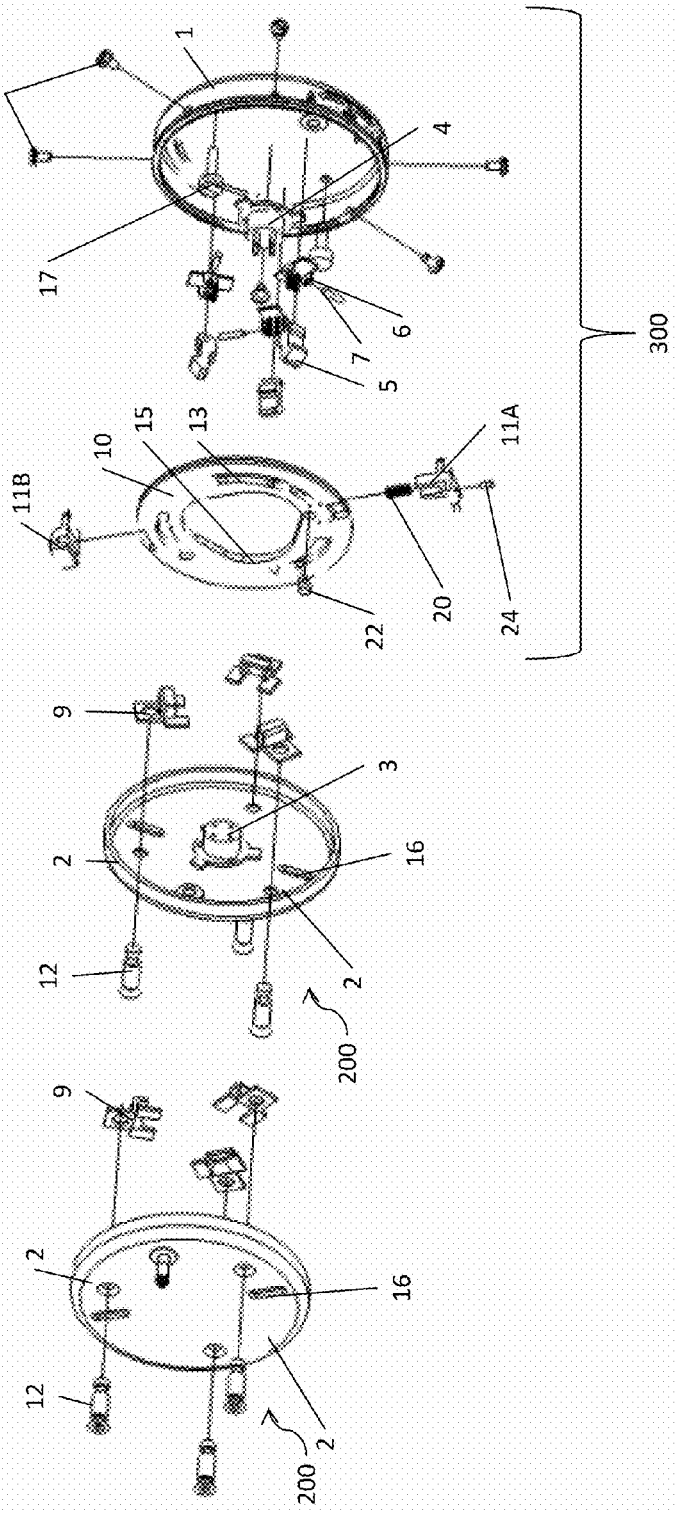
FIG. 6A is an exploded, perspective top view of one embodiment of the top plate of the invention.
FIG. 6B is an exploded, perspective bottom view of one embodiment of the top plate of the invention.
FIG. 6C is an exploded, perspective top view of one embodiment of the cam plate of the invention.
FIG. 6D is an exploded, perspective top view of one embodiment of the bottom plate of the invention.

With reference to FIGS. 2 and 6C, the cam plate 10, via the moving tab 11A and the fixed tab 11B attached to the cam plate 10, not only holds the hooks 5 in one of three positions, but also engages and disengages the support pins 12 with the key slots 13. The moving tab 11A moves radially towards the center against the tab spring 20 which is stopped or held in place by the tab spring stop 22. The moving tab 11A has on the side opposite the tab spring 20 a locking pin 24, which is a modified dowel pin.

Figure 5:
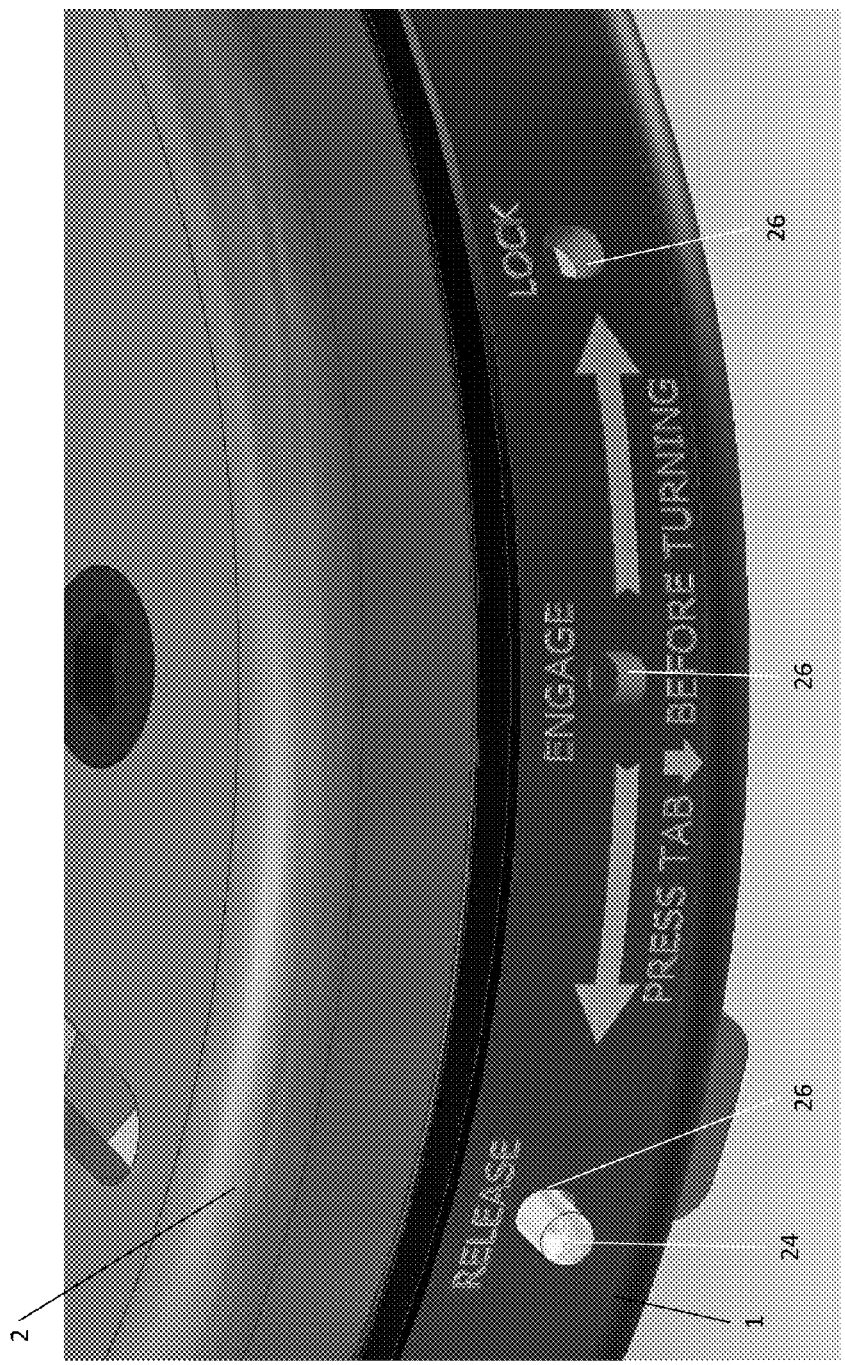
FIG. 5 is a close-up view of locking mechanism of an embodiment of the invention.

With reference to FIG. 5, when the moving tab 11A is not being manually pressed radially toward the center of the assembly, the locking pin 24 is engaged in one of three locking pin holes 26 in the bottom plate 1. When the locking pin 24 is engaged in one of the three locking pin holes 26 the cam plate 10 is prevented from rotating within the bottom assembly 300. When the moving tab 11A is manually pressed radially toward the center of the assembly the locking pin 24 disengages from the locking pin hole 26 and the cam plate 10 can be rotated. Each of the locking pin holes 26 represents one of three states or positions into which the cam plate 10 can be placed. In other words, the moving tab 11A moves radially against the tab spring 20 to release and lock the cam plate 10 into one of three positions.

Alternatively, the tabs may both be fixed tabs and merely provide finger holds for rotating the cam plate into the available positions, without locking the cam in the position.

The first position is "neutral" or "device installation" or "engage", which is the middle position of the three available positions. In the neutral or device installation position, the hooks are positioned in such manner that the beveled edge of the hooks will contact the hook slots when the bottom assembly is brought toward the top assembly, causing the hooks to retract and slide inside the hook slots 9 in the top assembly 200 when the bottom assembly 300 and the top assembly 200 are brought together. In this neutral position, once the hooks 5 are through the hook slots 9, the hook springs 8 operate to pivot the hooks 5 around the rivet 7 so that the hooks 5 engage over the hook slots. Once in this position, the two assemblies 300, 200 are mechanically and electrically connected, thus mechanically connecting the appliance to the support; e.g., the ceiling fan to the ceiling; the TV to the wall. The cam plate 10 via the tabs 11A, 11B is then moved to a "locked" position such that the cam plate 10 and the hooks 5 are locked in place over the hook slots of the top assembly 200 so that the hooks 5 are fully engaged in the top assembly 200 and thus the bottom assembly 300 which is connected to the hooks 5 via the hook mounts 6 cannot be disengaged from the top assembly 200. The cam plate 10 via the tabs 11A, 11B may also be moved to an "open" or "retracted" or "release" position. In the release position, the interior cam profile 15 will force the hooks 5 to retract towards the center of the assembly against the pressure of the hook springs 8 in such position that they will slide out of the hook slots 9, thus disengaging the bottom assembly 300 from the top assembly 200 (and thus, mechanically and modularly disconnecting the ceiling fan, TV, etc., from the wall or ceiling). In addition to controlling the hooks 5, the tabs 11A, 11B also operate the cam plate 10 in such a manner that the support pins 12 on the top assembly 200 engage or disengage as desired with the key slots 13 on the cam plate 10. In the locked position, the cam plate 10 is positioned in such manner to ensure that the support pins 12 are tightly engaged and locked into the key slots 13 and, therefore, the top assembly 200 and bottom assembly 300 remain securely engaged. In the open or retracted position, the cam plate 10 is positioned in such manner to ensure that the support pins 12 are disengaged and free to slide out of the key slots 13 thus enabling the top assembly 200 and the bottom assembly to be slid apart. The support pins 12 are permanently attached to the top assembly 200 via screws and extend downward toward the bottom assembly 300. The cam plate 10 with key slots 13 is located in and attached to the bottom assembly 300, for example, by retaining pins 25. Each of the key slots 13 has a wide end 13A and a narrow end 13B. The key slots 13 are located in the cam plate 10 in such a way that when the tabs 11A, 11B and cam plate 10 are in the open (retracted) or neutral (device installation) positions, the support pins 12 may slide in and out of the key slot 13A. However when the tabs 11A, 11B and the cam plate 10 are in the locked position, the cam plate 10 is rotated in such a manner that the head 12A of the support pins 12 are engaged below the narrow end of the key slot 13B and are unable to slide out of the key slot 13B. In this way, the bottom assembly 300 and the top assembly 200 are bound together by both the hooks 5 and the support pins 12. To disengage the top assembly 200 from the bottom assembly 300, the tabs 11A, 11B and the cam plate 10 are moved to the neutral or open position which places the support pins 12 in an area of the key slots 13A wide enough that the support pins 12 will slip out of the key slot 13A and become disengaged from the key slot.

Thus, the quick mounting device with a modular connection for appliances includes a top assembly attachable to a support and a bottom assembly attachable to an appliance. The top assembly further includes a top plate with mounting slots, support pins, hook slots, and a modular connector; wherein the mounting slots are positioned to mount the plate to the support, the support pins and the hook slots are securely fastened to the top assembly and project downward.

The bottom assembly includes a bottom plate with mounting bolts; hooks; hook mounts with rivets and springs; a cam plate with key slots having a wide end and a narrow end and an interior profile; cam retaining pins, cam positioning tabs and a mating modular connector. The mounting bolts secure the plate to the appliance; the hook mounts are securely fastened to the bottom assembly; the hooks are fastened to and pivot around the hook mounts by the rivets; the springs rotate the hooks toward the periphery of the plate; the retaining pins hold the cam in the plate and permit the cam to rotate in the plate; the cam positioning tabs provide finger holds for rotating the cam; the interior cam profile has three positions to permit the hooks to slide past the hook slots for engaging or retract towards the center for removal or expand towards the periphery for locking.

The assemblies are engagable by positioning the cam in the engage position; lifting the bottom assembly toward the top assembly such that the hooks slide past and then engage the hook slots and the support pins extend through the wide end of the cam key slots;

The assemblies are lockable by rotating the cam to the locked position, thereby locking the support pins with the narrow end of the key slots and fully extending the hooks into the hook slots.

The modules are positioned to mate when the top and bottom assemblies are brought together.

Thereby the present invention provides a mounting device that is quickly and easily engaged and disengaged mechanically and modularly without the use of tools and furthermore has two mechanical engagement mechanisms.

The cam tabs may further include a moving cam tab with a locking pin with spring and the cam plate includes three locking pin holes corresponding to an engage position, a lock position, and a release position; the moving tab with locking pin positionable in any of the three locking pin holes and releasably locking the cam plate in the position.

To use the quick mount device, the user attaches the top assembly 200 to the wall, ceiling or other surface by using screws, bolts or other suitable attachment means through the mounting slots 16 into the wall, ceiling or other surface. The user also connects the modular connector 3 in the top assembly to a corresponding circuit or channel. The user then attaches the bottom assembly 300 to the device to be mounted (ceiling fan, etc.) via the special mounting bolts 17. The user connects the modular connector 4 in the bottom assembly to the corresponding circuit or channel of the device to be mounted.

The user then moves the cam plate 10 via the tabs 11A, 11B to the neutral position. As the user lifts the device to be mounted toward the top assembly 200 and the hooks 5 begin to engage the hook slots 9 in the top assembly 200, the hooks 5 will pivot around the rivet 7 in such a way to allow the hooks 5 to pass through the hook slots 9. Once the hooks 5 are through the hook slots 9, the hook springs 8 rotate the hooks 5 around the rivets 7 in the opposite direction securing the hooks 5 over the hook slots 9. Thus, merely by lifting the device into place, the device is attached, without the use of tools, to the top assembly 200 and thus the ceiling, wall or other support. Absent the quick mount device, the user would have to lift the device into place and use one arm/hand to hold the device in place while using some sort of tool with the other arm/hand to secure the device to the ceiling or wall. Instead, with the quick mounting device, the hooks 5 hold the device in place thus freeing up both of the user's arm/hands to further secure the device without tools to the ceiling or wall as follows. Once the hooks 5 are engaged over the top assembly 200, the user via the tabs 11A, 11B rotates the cam plate 10 to the locked position. In the locked position, the support pins 12 on the top assembly 200 engage the narrow end of the key slots 13B thus bringing the top assembly 200 and bottom assembly 300 tightly together. The bottom assembly 300 is now completed supported and securely attached to the top assembly 200 by the support pins 12 and not the hooks 5. In fact, in the locked position, the hooks 5 may be raised off of the surface of the top assembly 200. Also, in the locked position the cam profile 15 fully engages the hooks 5 in position over the top assembly 200, giving the device two mechanisms of engaging or holding the assemblies together. Thus, even were the support pins 12 or the key slots 13 to fail, the bottom assembly 300 and the top assembly 200 would remain securely mated and the device would remain mounted on the ceiling or wall because of the hooks.

To remove the device from the ceiling or wall, the tabs 11A, 11B are rotated into the release (retracted; open) position. The support pins 12 are now in the wide end of the key slots 13A where they can be disengaged from the bottom assembly and the hooks 5 are held in a retracted position whereby they can freely pass by the hook slots 9 in the top assembly 12. Thus, the top assembly 200 and the bottom assembly 300 may be disengaged from one another and the device removed from the wall or ceiling.

Many different types of transmission circuits and channels exist, each requiring a specific type of connection to prevent accidents. These connections have been modularized to facilitate connection and prevent wrong connections, which can be dangerous. Some examples of circuits and channels include audiovisual channels, both analog and digital; other digital communication channels; electrical power circuits; gas lines; liquid lines, and the like.

Audiovisual Connectors

The present invention includes embodiments designed to include modular audiovisual connectors, including connectors for HDMI, DVI, Component Video, S-Video, Composite Video, RGB/VGA, Stereo analog, Digital Coax, Digital Optical, Multi channel, HD DVD and Blu Ray for Dolby TrueHD and DTS-HD Audio Support, TRS and TRRS connectors (audio jacks).

Other Digital Communications Connectors and Devices

The present invention also includes the incorporation of other digital connectors. For example, digital connectors may include USB, RS-232, Firewire, Cable, Ethernet and telephone connectors, including 10P10C, 8P8C, 6P6C, 6P4C, and 4P4C plugs and their corresponding jacks RJ49, RJ61, RJ45, RJ25 RJ14 RJ11, RJ22, RJ10, RJ9, RJ25 and the like. Also, wireless communication devices can be included in the present invention. For example, wireless devices for RF, IR, Bluetooth, Optical, and the like can be incorporated into the present invention. Also, long distance wireless technology can be included in devices according to the present invention.

Electrical Connectors

The present invention also includes the incorporation of electrical power circuit connectors. For example, embodiments with NEMA connectors and the like are included in the present invention. Standard electrical connectors in other countries not using NEMA standards are also included in the present invention. Embodiments with twist-locking connectors are also included in the present invention. In these cases, the male plug is preferably incorporated in the cam plate. The male plug twists when the cam is rotated, locking the male plug into the female receptacle.

Gas Connectors

Medical gas and oxygen quick-connectors for medical applications, such as Ohmeda style, Schrader style, Chemetron style, Puritan style, Diameter Index Safety System (DISS) style, and the like are included in the present invention. Also, embodiments with air hose quick disconnects are included in the present invention.

Modular Applications

The present invention advantageously permits the quick mounting of a variety of appliances, including appliances for residential use; commercial/industrial use; professional audio/video systems; trade show displays; movie, television, and theater productions; food and beverage applications; medical applications, marine applications, aerospace applications, space research applications, automobile industry applications.

Figure 8:
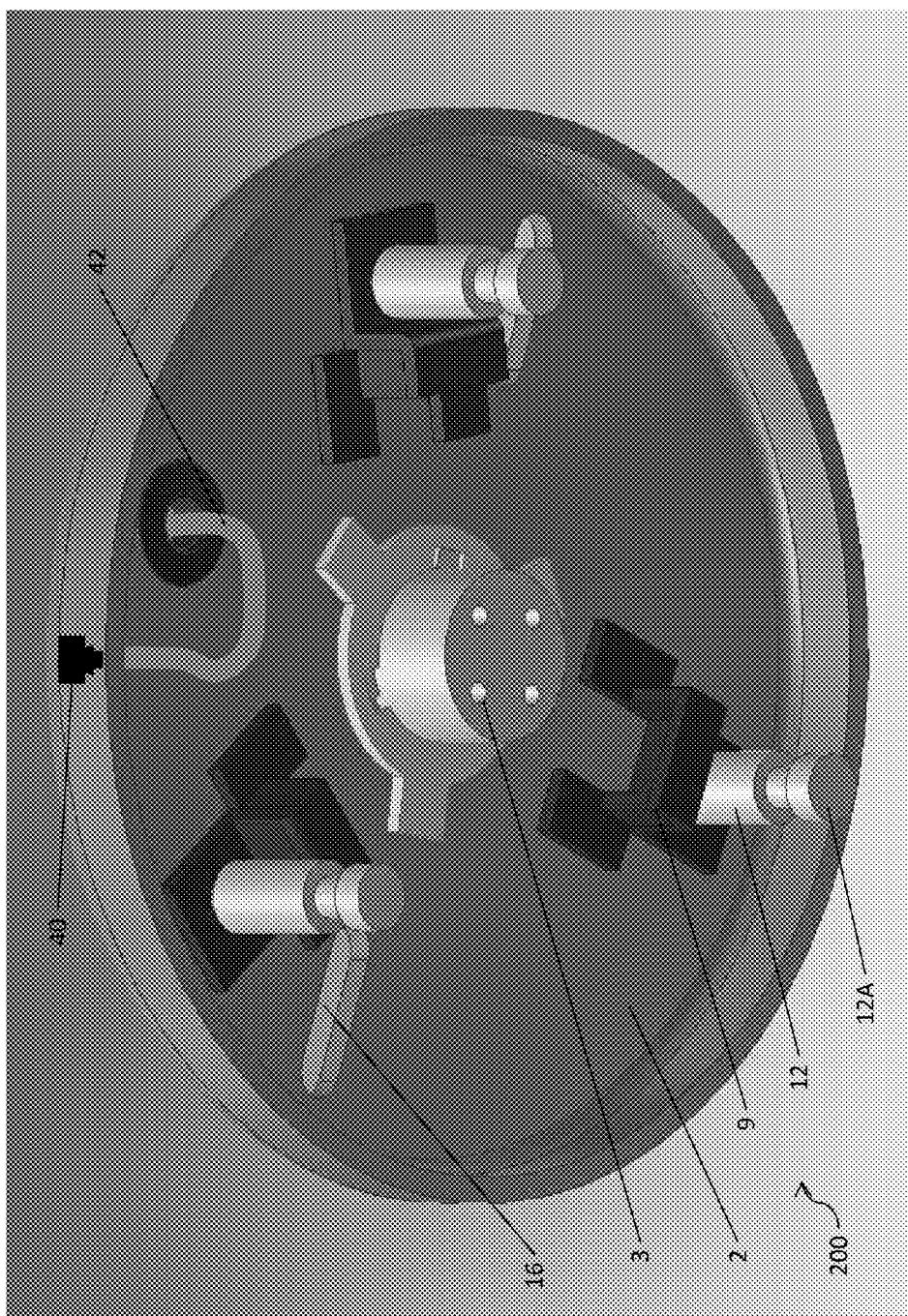
FIG. 8 is a perspective view of an example embodiment of the present invention with an electrical connection and an Ethernet connection.

Residential applications include, but are not limited to, ceiling fans, rear projector mounts, home theater speaker mounts, decorative sign/device/art, electromechanical appliances, air/pneumatic tool systems, flat screen and tube TV mounts, security camera mounts, garage door openers, and the like. Many residential applications require two modular connectors, such as an electrical connector and a communications connector. In these cases, the electrical connector is preferably in the center position of the assemblies and the modular connector is on the side, as shown in FIG. 8. FIG. 8 describes an example embodiment of the present invention. In this embodiment, the first assembly includes a female electrical receptacle 3 and an Ethernet receptacle 40 connected to a computer network via an Ethernet cable 42. The second assembly (not shown) includes a mating male electrical receptacle. Once the first and second assemblies are brought together and the appliance thus mounted, the appliance can then be connected to a computer network via the Ethernet connection.

Figure 9:
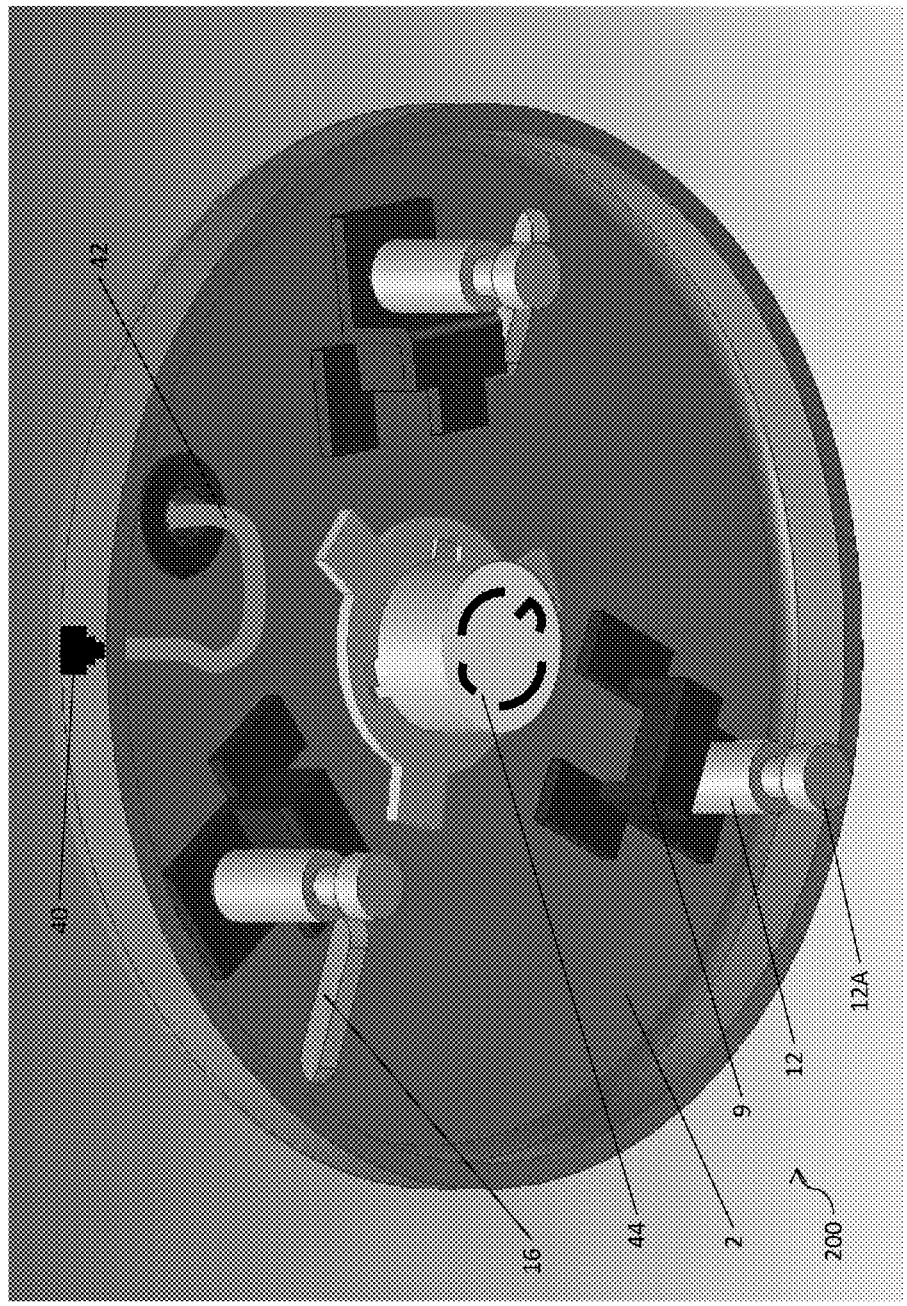
FIG. 9 is a perspective view of an example embodiment of the present invention with a quick-lock electrical connection.

Commercial/industrial applications include commercial flat panel displays, signs, audio, lights, projectors, art and devices, tools for assembly lines, workstations, fans, and the like. These applications generally receive significant use and consequently the present invention will facilitate the work process in these areas because of the ease with which the present invention permits the mounting and dismounting of appliances. These applications use all types of connectors. An example embodiment, shown in FIG. 9, demonstrates a first assembly of a mounting device for a 240 volt appliance. The first mounting assembly includes a 240 V twist-lock electrical receptacle 44. The receptacle is positioned in the first assembly and the mating plug is mounted in the cam of the second assembly such that the plug turns and locks with the receptacle when the cam is turned to the locked position.

Professional audio/video applications include embodiments to quickly mount and dismount fly-rigging audio, microphones, light systems, video systems and the like for concerts, amphitheaters, stadiums, tours, shows, theaters, and the like. These applications generally have Neutrik connectors, or anelectrical connection and an audiovisual or control communication connection. For example, lighting systems would include an electrical connector and a control communication connector such that the lights can be controlled remotely. Cameras and speaker systems would instead have an electrical connection and an audiovisual type connection to receive audiovisual feed.

Microphones would generally include a combined electrical and a communication connection, such as an XLR audio jack. In these cases, the modular system has a single, integrated connector.

Trade show applications include embodiments for mounting signs, displays, lights, sets & props, and booths. The present invention advantageously favors the quick assembly and disassembly required for these applications.

Movie/TV/Theater/Independent Movie Production applications include embodiments for moving and connecting cameras, microphones and other equipment to various rigs to make movies/films/TV shows. These applications would include many of the same applications as professional audiovisual applications. These applications would further include professional camera systems for recording video. Such camera applications require numerous power and audiovisual connections.

Food and Beverage applications include embodiments to mount towel dispensers, hand dryers, mirrors, sinks, garbage bins, and the like. Today, these applications are frequently automated to better provide service. For example, towel dispensers use infrared sensors to automatically dispense paper towels. These types of applications receive much abuse and require frequent cleaning and repair. The present invention advantageously permits the user to quickly dismount these appliances for ease of cleaning and repair.

Medical applications for the present invention include embodiments for mounting surgery lights, anesthesia/surgical pendants, and the like.

Emergency response, military and other transportation applications include embodiments for quick lock/unlock securing mechanism for transporting appliances such as gurneys, O2 tanks, and the like in vehicles, especially fire trucks, ambulances, and military applications. These applications frequently require data communication between the appliance and a control center or telecommunications center.

Figure 10:
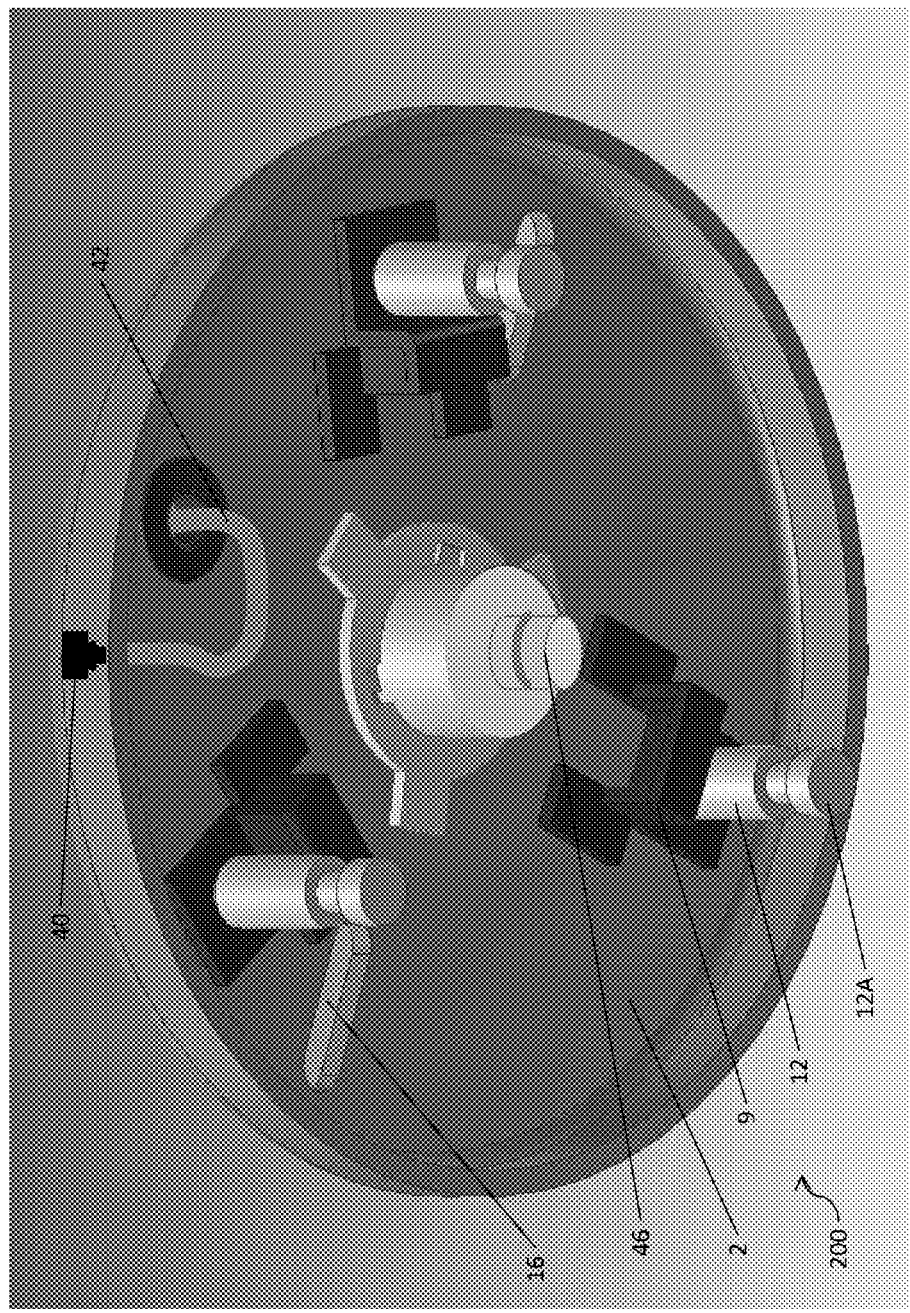
FIG. 10 is a perspective view of an example embodiment of the present invention with a hydraulic attachment.

Plumbing connections are also included in the present invention. For example, a liquid hose attachment, shown in FIG. 10, includes a quick-release fitting 46.

Electrical Current Modification Devices

Figure 11:
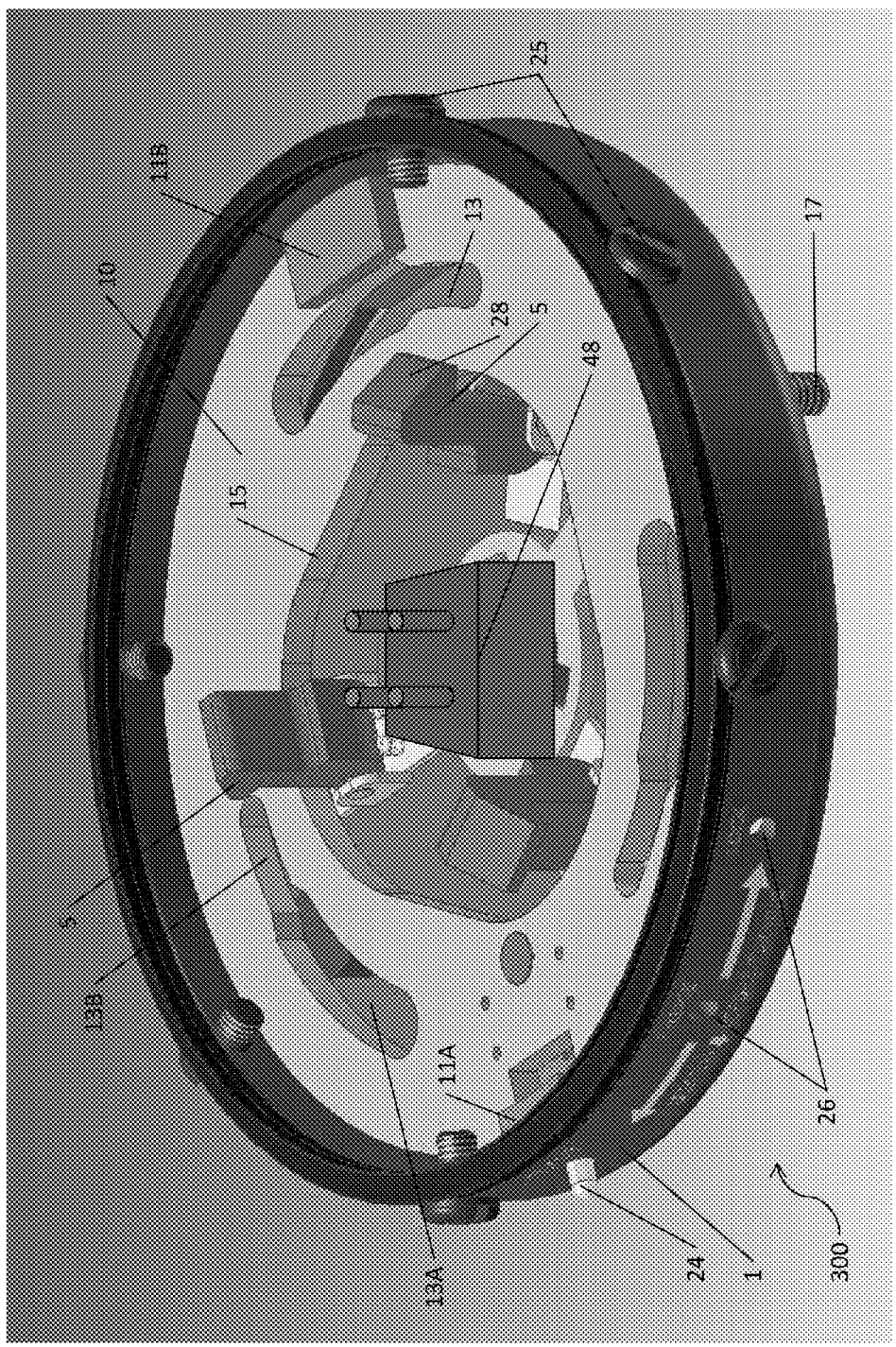
FIG. 11 is a perspective view of an example embodiment of the present invention with an electrical transformer.

The present invention further includes the incorporation of an electric modification device such as a transformer, rectifier, or converter in the device. The electric modification device can be affixed in the support-side component of the present invention or it can be affixed in the appliance-side component of the present invention. Mounting in the appliance-side component permits the user to change electrical appliances without having to change the electrical modification device. For example, the user can have an AC appliance connected to an appliance-side assembly with no transformer and a DC appliance connected to an appliance-side assembly with a rectifier. The user can thus easily switch the appliance without having to change any electrical modification devices. FIG. 11 shows an example embodiment, wherein an electrical transformer 48 is included in the appliance-side assembly.

The present invention further includes module(s) that provide customizable positioning. For example, multi-Arm attachments, as shown in FIG. 12A, can be used to custom position an attached appliance. These modules can include power connection.

Figure 13:
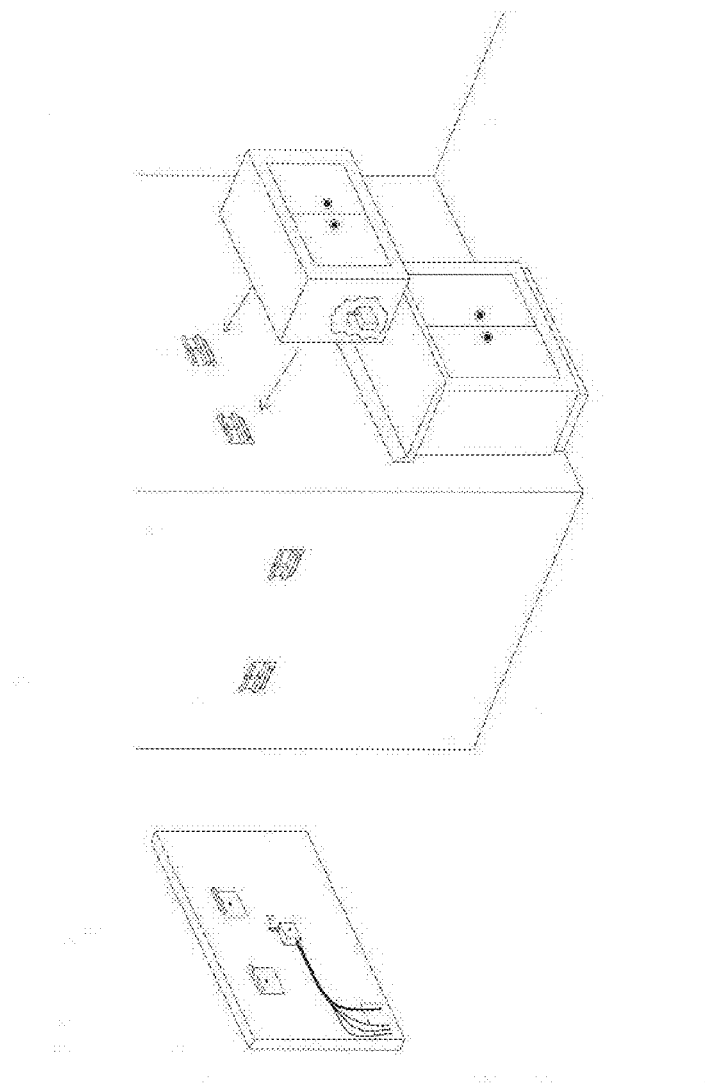
FIG. 13 is a perspective view of an example embodiment of the present invention.
Figure 14:
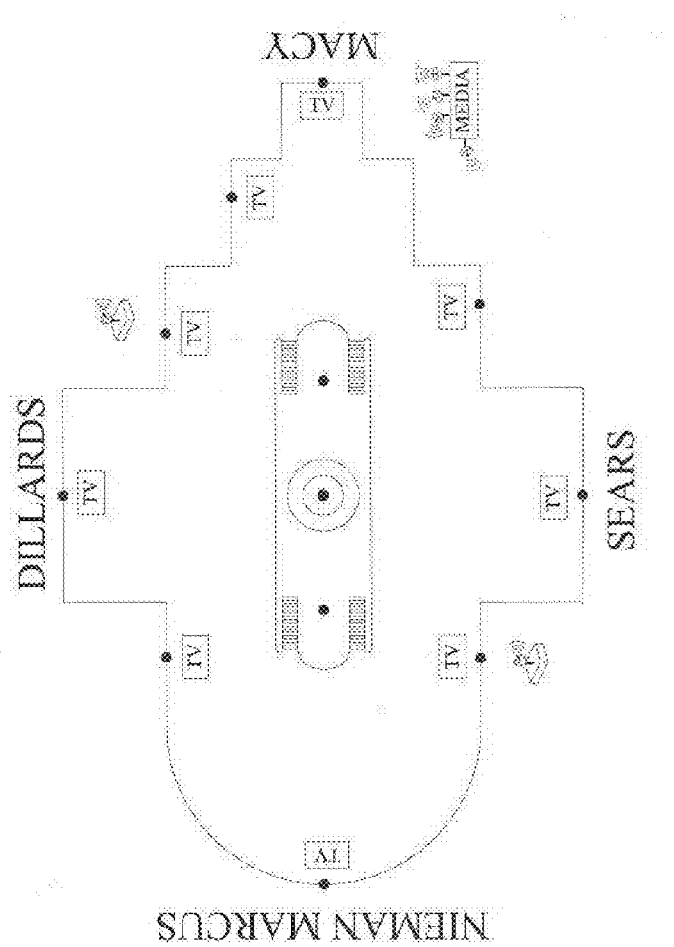
FIG. 14 is an example embodiment of the present invention showing a Commercial Module Shopping Mall example.

Customizable positioning is advantageous in particular industries. For example cabinet installation requires esthetic positioning of cabinets on walls and other supports that may themselves not be correctly oriented. An example is shown in FIG. 13. Using the present invention, a cabinet is mounted to a wall using two devices according to the present invention. Once mounted, the cabinet position is customizable horizontally because the devices provide for customizable positioning. FIG. 14 is an example embodiment of the present invention showing a Commercial Module Shopping Mall example.

Positioning Real Time, Coordinate 3D Powered and Automated Devices

The present invention also provides for room/device integration module(s). A 2, 3, 4(+) room module for audio/video/data device integration, automation and powered modules would be included in this module. The room/device integration module preferable uses wireless technology to eliminate physical connections; thus eliminating the cost of wired technology for retrofit installations, automation, and updating. Retro costs are much higher than pre-wire installations; this module allows for painless plug and play applications with any existing structure providing quick automation, powered and device connectivity with no additional high retro-fit cost of running wires after the fact.

Specialized automation module(s) are anticipated for powered and non-powered automation installs; retrofitting or new pre-wires; and integration and automation of new devices and technology with existing devices and tech.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A quick mounting device for appliances, comprising a top assembly attachable to a support and a bottom assembly attachable to an appliance,
   a. the top assembly further comprising a top plate with mounting slots, support pins, hook slots, and a first modular connector in between the mounting slots, the support pins and the hook slots; wherein the mounting slots are positioned to mount the plate to the support, the support pins and the hook slots are securely fastened to the top assembly and project downward;
   b. the bottom assembly comprising a bottom plate with mounting bolts; hooks; hook mounts with rivets and springs; a cam plate with key slots having a wide end and a narrow end, an interior profile; cam retaining pins, cam positioning tabs and a second modular connector in between the mounting bolts, the hooks, and the hook mounts; wherein the mounting bolts secure the plate to the appliance; the hook mounts are securely fastened to the bottom assembly; the hooks are fastened to and pivot around the hook mounts by the rivets; the springs rotate the hooks toward the periphery of the plate; the retaining pins hold the cam in the plate and permit the cam to rotate in the plate; the cam positioning tabs providing finger holds for rotating the cam; the interior cam profile having three positions to permit the hooks to slide past the hook slots for engaging or retract towards the center for removal or expand towards the periphery for locking;
   c. the assemblies engagable by positioning the cam in the engage position; lifting the bottom assembly toward the top assembly such that the hooks slide past and then engage the hook slots and the support pins extend through the wide end of the cam key slots;
   d. the assemblies lockable by rotating the cam to the locked position, thereby locking the support pins with the narrow end of the key slots and fully extending the hooks into the hook slots;
   e. the modular connectors positioned to mate in between the top plate and the bottom plate when the top and bottom assemblies are brought together, the modular connectors are two modular connections;
   f. thereby providing a mounting device that is quickly and easily engaged and disengaged mechanically and by at least one of the modular connections without the use of tools and furthermore has two mechanical engagement mechanisms.

2. The device of claim 1, wherein one of the cam tabs is a moving cam tab with a locking pin with spring and the lower plate includes three locking pin holes corresponding to an engage position, a lock position, and a release position; the moving tab with locking pin positionable in any of the three locking pin holes and releasably locking the cam in the position.

3. The device of claim 1, wherein the modular connections is selected from the group consisting of analog communication, digital communication, electrical power, gas, liquid, and the like.

4. The device of claim 1, wherein the appliance is selected from the group consisting of residential appliance; commercial/industrial appliances; professional audio/video appliances; trade show appliances; movie, television, and theater production appliances; food and beverage appliances; and medical appliances.

5. The device of claim 1, wherein the modular connections is a twist-lock connection incorporated in the cam plate.

6. The device of claim 1, further including an electrical current modification device in one of the assemblies.

7. The device of claim 6, wherein the electrical current modification device is selected from the group consisting of converters, inverters, and transformers.

* * * * *